United States Patent [19]

Mosley, Sr.

[11] Patent Number: 5,759,568

[45] Date of Patent: *Jun. 2, 1998

[54] METHOD FOR PRODUCING ANIMAL FOODSTUFF FROM WASTE

[75] Inventor: Kenneth L. Mosley, Sr., Trussville, Ala.

[73] Assignee: AMCOL International Corporation, Arlington Heights, Ill.; a part interest

[*] Notice: The term of this patent shall not extend beyond the expiration date of Pat. No. 5,204,007.

[21] Appl. No.: 656,099

[22] Filed: May 31, 1996

[51] Int. Cl.$^6$ .................................................. A23K 1/165
[52] U.S. Cl. ....................................... 424/442; 424/439
[58] Field of Search ........................... 424/442; 426/623, 426/630, 635, 656, 657

[56] References Cited

U.S. PATENT DOCUMENTS

| | | | |
|---|---|---|---|
| 4,282,256 | 8/1981 | Evich et al. | 426/7 |
| 5,204,007 | 4/1993 | Mosley et al. | 210/705 |

OTHER PUBLICATIONS

Brochure for Scott A.S.T. Dryer.

*Primary Examiner*—Thurman K. Page
*Assistant Examiner*—Kathryne E. Shelborne
*Attorney, Agent, or Firm*—Veal & Associates

[57] ABSTRACT

An improved method for recovering and processing waste water solids into animal foodstuff wherein bentonite is added to waste water comprising oils, fatty acids, grease, or the like. The pH of the waste water is regulated, bentonite and a polymer are added, and the treated waste water is transferred into an air flotation device. A float blanket containing solids and water forms readily and is removed and transferred to a drying apparatus. The float material, or sludge, typically contains between 2–10% solids and is ready to be introduced into the drying apparatus without further modification. However, the sludge is usually belt compressed to obtain a solids concentration between 20–40% to assist in handling and drying. The drying apparatus employed contains two zones. In the first zone, air enters the dryer at a very high temperature where it encounters the sludge also being introduced. As the sludge comes into contact with the hot air, it is flash dried. The first zone exposes the sludge to intense agitation to break up lumps and agglomerates in the sludge and facilitate the flash drying. The majority of the moisture is evaporated in the first zone. As the material proceeds through the second zone, secondary drying takes place through product retention time. The amount of agitation in the first zone and the length of time in either zone can be adjusted to meet the desired consistency of the end product. After drying is complete, the material is ready for use as animal foodstuff.

18 Claims, 2 Drawing Sheets

METHOD FOR PRODUCING ANIMAL FOODSTUFF FROM WASTE

FIELD OF THE INVENTION

The present invention relates to the field of waste recovery. More particularly, it relates to an improved method for processing waste into animal foodstuff. Specifically, it is a method for processing sludge containing fats and proteins into animal foodstuff.

BACKGROUND OF THE INVENTION

Present methods for removing solids from waste water include filtration, sedimentation and flotation. Once removed, the solid waste, or sludge, is either disposed of in landfills or recycled. The present invention is concerned with recycling the sludge removed from waste water into a substance suitable for use as animal foodstuff. In the dissolved air flotation (DAF) method, waste water is treated with coagulants and polyelectrolyte polymers, injected with a gas, and retained for a period of time in a retention vessel. This retention time allows a blanket of solids to form on the surface of the retained waste water. The blanket consists of a sludge usually comprising between 2-10% solids with the remainder as water. In some instances, the sludge is belt compressed to remove a portion of the water, resulting in about 20-40% solids. Typically, the sludge is removed for disposal in a landfill or further processing. This type of method and the various substances used are well known in the art.

Recycling the sludge into useful products has developed to avoid disposal into landfills, which is both expensive and wasteful. Some useful products include fertilizers or animal foodstuffs. A common method of processing the sludge into animal foodstuff involves mixing the recovered sludge with offal and cooking and drying the product into a form suitable for animal feed. Whether the sludge is mixed with other materials or not, the sludge must be ultimately dried. Present industry standards for processing sludge involves drying the sludge in conventional industrial dryers, such as the rotary drum or fluid-bed type dryers. As a result of the drying process, it was found that fats, such as oils, fatty acids, greases, or the like, in the sludge liquify. This has resulted in various problems, including a greasy product which is troublesome to handle, a greasy residue in the dryer which requires frequent cleaning, and instances where the liquified oils have ignited and destroyed expensive commercial dryers. The response in the industry has been to add additional substances, such as cornmeal or soybean meal, to the sludge to bind the fats and assist in drying.

One method for generating a product which can be further processed into animal foodstuff was disclosed in U.S. Pat. No. 5,204,007 by one of the present inventors. The '007 patent discloses using bentonite (coagulant) and anionic polymers to treat non-toxic waste water, resulting in a sludge which is non-toxic and thus appropriate for further processing into animal foodstuff. However, I have now discovered that when bentonite is used as a coagulant as disclosed in the '007 patent, and when a specialized drying method is used, the residual bentonite in the sludge prevents fat from liquifying without the use of any additives. Thus, the use of bentonite in waste recovery along with this drying method improves the drying process by removing the additional step of treating the sludge with substances to bind the fats.

SUMMARY OF THE PRESENT INVENTION

It is the object of the present invention to provide an improved method for recovering and processing waste water solids into animal foodstuff.

It is another object of the present invention to provide an improved method for processing waste water solids into animal foodstuff which saves time, resources and expense.

It is still another object of the present invention to provide an improved method for drying recovered waste water solids into animal foodstuff.

These and other objects of the present invention are accomplished through an improved method wherein bentonite is added to waste water comprising oils, fatty acids, grease, or the like. The pH of the waste water is regulated, bentonite and a polymer are added, and the treated waste water is transferred into an air flotation device. A float blanket containing solids and water forms readily and is removed and transferred to a drying apparatus. The float material, or sludge, typically contains between 2-10% solids and is ready to be introduced into the drying apparatus without further modification. However, the sludge is usually belt compressed to obtain a solids concentration between 20-40% to assist in handling and drying. The drying apparatus employed contains two zones. In the first zone, air enters the dryer at a very high temperature where it encounters the sludge also being introduced. As the sludge comes into contact with the hot air, it is flash dried. The first zone exposes the sludge to intense agitation to break up lumps and agglomerates in the sludge and facilitate the flash drying. The majority of the moisture is evaporated in the first zone. As the material proceeds through the second zone, secondary drying takes place through product retention time. The amount of agitation in the first zone and the length of time in either zone can be adjusted to meet the desired consistency of the end product. After drying is complete, the material is ready for use as animal foodstuff.

These and other objects and advantages of the invention will become apparent from the following detailed description of the preferred embodiment of the invention.

BRIEF DESCRIPTION OF THE DRAWINGS

The features of the invention are illustrated in the accompanying drawings which form a portion of this disclosure and wherein.

DETAILED DESCRIPTION OF THE PREFERRED EMBODIMENT

Figure 1:
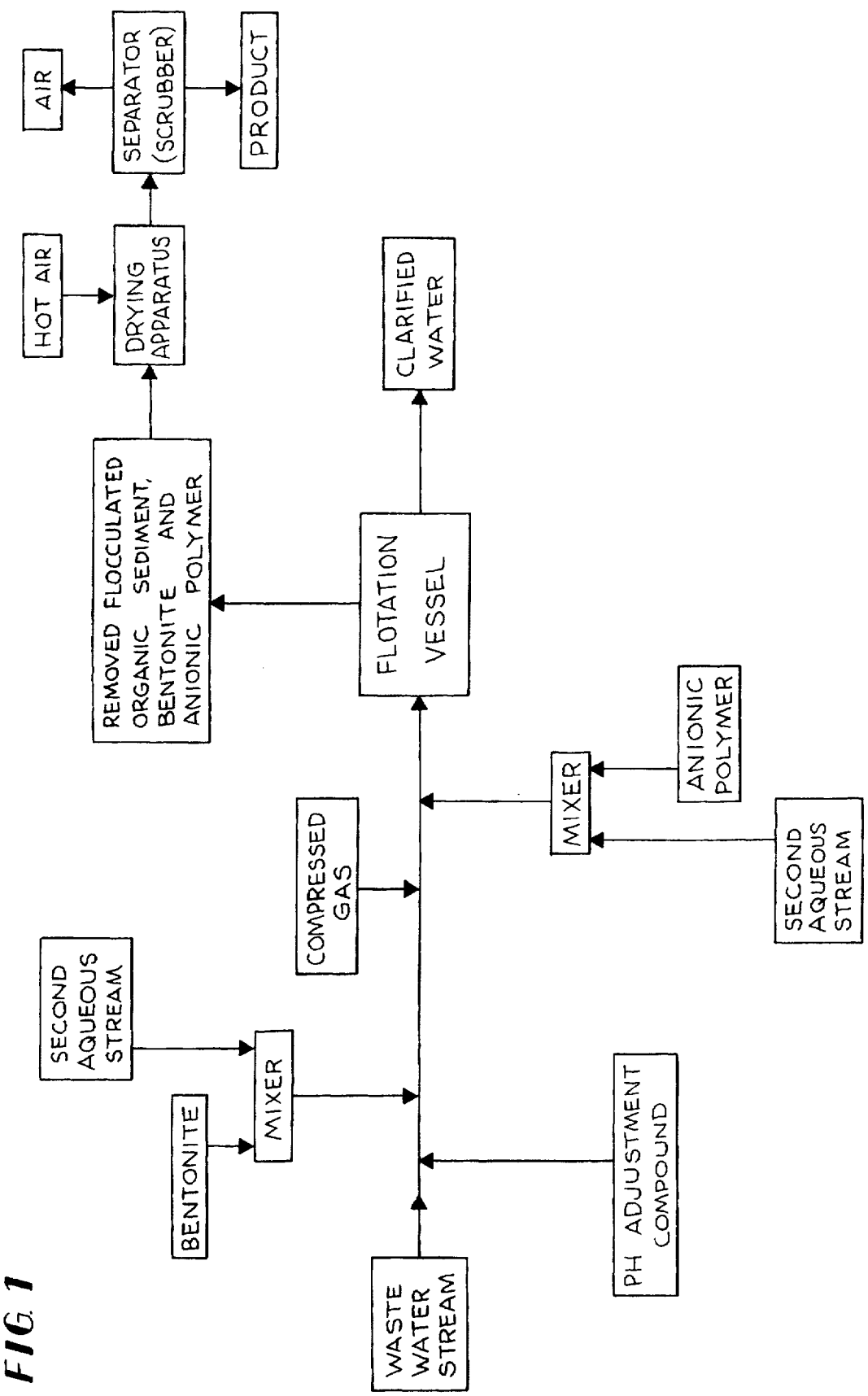
FIG. 1 is a diagram of the preferred embodiment of the invention.
Figure 2:
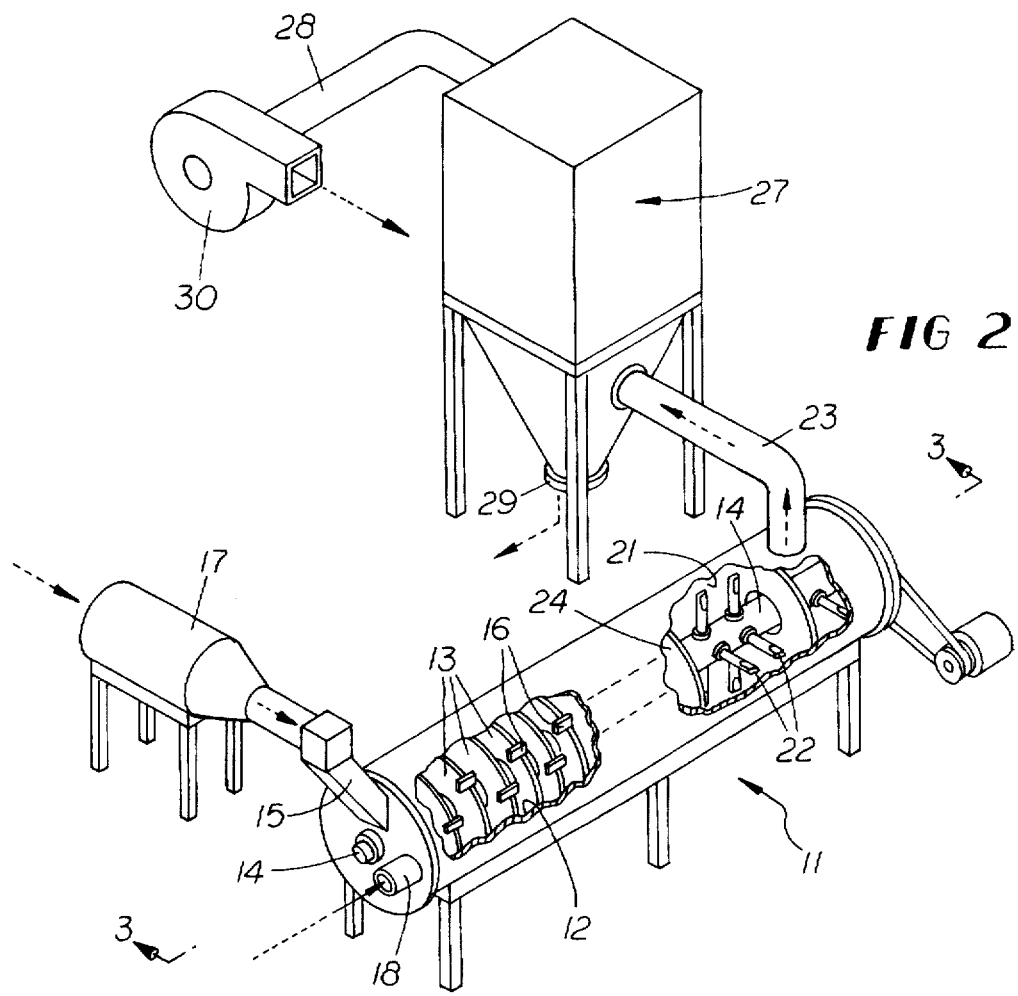
FIG. 2 is a perspective view of the drying assembly.
Figure 3:
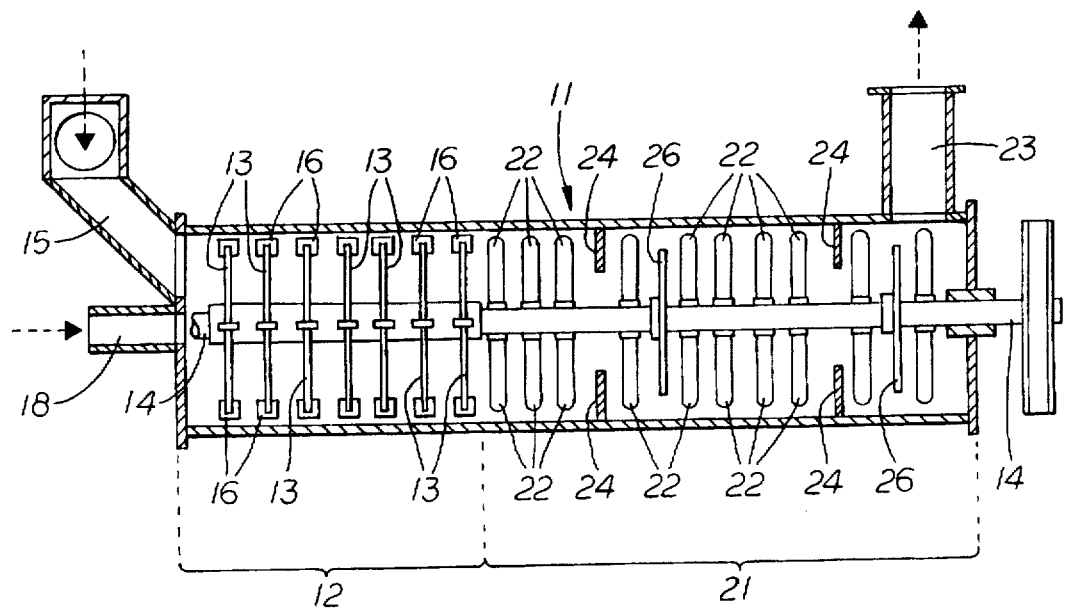
FIG. 3 is a sectional view of the dryer.

A more complete understanding of the invention may be obtained by reference to the accompanying drawings wherein, according to the preferred embodiment, a waste water stream is fed through a waste processing system wherein the pH is adjusted between 3.5 to 9.0. A bentonite-water mix is prepared in the form of a slurry containing 1-10% bentonite. The slurry is metered into the waste water stream at a rate of 100-1000 milligrams of equivalent dry bentonite per liter of waste water. A polymer-water solution is prepared, containing 0.01-5.0% polymer by weight, and is added to the waste water at a rate of 0.05-10 milligrams of equivalent dry polymer per liter of waste water. The polymer can be cationic, anionic, or non-ionic. Compressed gas, preferably air, is injected into the waste water stream and the mixture is retained in a flotation vessel to allow the solids to float to the surface of the waste water. A float blanket containing solids and water forms readily and is removed and transferred to a drying apparatus. The clarified water is typically discharged into a municipal sewer. The foregoing dissolved air flotation method using bentonite and anionic polymers is taught at length in U.S. Pat. No. 5,204,007, incorporated herein by reference, and will not be reiterated herein.

The float material, or sludge, typically contains 2–10% solids and is ready to be introduced into the drying apparatus without further modification. However, the sludge is preferably belt compressed prior to introduction into the dryer to obtain a solids concentration between 20–40% to assist in handling and drying. The preferred drying apparatus 11 contains two zones. The first zone 12 of dryer 11 is comprised of a plurality of baffles 13 mounted for rotation about a motor driven spindle 14. Baffles 13 have a plurality of transverse blades 16 mounted thereon. Air is heated in a furnace 17 and introduced into first zone 12, preferably between 500–1000 degrees Fahrenheit, through an air inlet 15. The sludge is introduced through a sludge inlet 18 into first zone 12 at ambient temperature. The hot air is mixed with the sludge in first zone 12 by blades 16 on rotating baffles 13. As the sludge comes into intact with the hot air, it is flash dried. Baffles 13 slow air movement as blades 16 mix the air and sludge through intense agitation. The agitation breaks up lumps and agglomerates and thoroughly mixes the float material with the hot air. The majority of the moisture is evaporated in the first zone.

As the material proceeds through the second zone 21, secondary drying takes place through product retention time. Second zone 21 is comprised of a plurality of paddles 22, also mounted for rotation about spindle 14. Paddles 22 further agitate the drying sludge, or product, as the product is propelled toward the dryer outlet 23. Second zone 21 has baffles 24 and 26 mounted therein to alter the air flow and optimize processing of the product. Baffles 24 are fixed to the wall of second zone 21, while baffles 26 are mounted for rotation on spindle 14. The air, steam, and drying product are concomitantly pulled through dryer 11 and are drawn into a separation chamber 27 by a fan 30. The separation chamber can be an air scrubber, bag house, cyclone separator, or any other air separating means known in the art. The air leaves separation chamber 27 through an air duct 28 where it can be optionally recycled into the drying system. The product drops out through an opening 29 in the bottom of separation chamber 27.

The air leaving the dryer is typically between 200–300 degrees Fahrenheit. The product temperature is approximately equal to the exiting air temperature, between 200–300 degrees Fahrenheit, and usually never exceeds it. The product is both pushed through the dryer by incoming sludge and pulled through the dryer by the air current. The amount of agitation in the first zone and the length of time in either zone can be adjusted to meet the desired consistency of the end product. Typically, the end product has a moisture of approximately 10%; however, moisture concentrations as low as 1–2% are obtainable if desired. After drying is complete, the material is ready for use as animal foodstuff.

Examples of dryers suitable for use in the present method are the Air Swept Tubular (AST) Dryers manufactured by Scott Equipment Company. Some specifications on the Scott AST dryer are:

| Dryer Size | SCFM*(air) | ACFM#(air) | Max. H₂O/hr.(lbs) | Max. Solids/hr.(lbs) | Burner Size | Tube (ft²) |
|---|---|---|---|---|---|---|
| 20" × 12' | 1600 | 2600 | 1200 | 3600 | 1.0/2.5 mm | 2.18 |
| 30" × 12' | 3700 | 6000 | 2750 | 8325 | 2.5/4.0 mm | 4.9 |
| 36" × 12' | 5300 | 8570 | 4000 | 11,925 | 4.0/6.0 mm | 7.06 |
| 48" × 15' | 9500 | 15,400 | 7,125 | 21,375 | 6.0/9.0 mm | 12.56 |
| 60" × 18' | 14,750 | 25,000 | 11,100 | 33,188 | 15.0 mm | 19.62 |
| 72" × 18' | 21,200 | 34,250 | 15,900 | 47,700 | 22.0 mm | 28.62 |

*Standard Cubic Feet/Minute
Actual Cubic Feet/Minute

It is to be understood that the foregoing Scott AST dryers are preferred, but not required for the present invention. Other dryers, such as the rotary drum or fluid-bed type dryers, could be substituted and altered to process the sludge in an equivalent fashion.

In the foregoing method, the sludge must be introduced into the dryer within 36 hours or the fats may be subject to liquification. Apparently, bacteria and enzymes inherent to the waste begin breaking down the bentonite-fat bond such that the fat will liquify during the drying process. However, we have found that if the pH is kept below 5.0, preferably between 4.0 to 4.5, the sludge is stable to approximately 96 hours before significant degradation of the bentonite-fat bonds occur. Therefore, under conditions where the pH of the waste water is maintained above approximately 6.0, the reclaimed sludge must be dried within 36 hours. However, if it is necessary to prolong that time before drying the sludge, then the waste water should be processed at a pH below 5.0.

It is to be understood that the method of the invention disclosed is a preferred embodiment thereof and that various changes and modifications may be made therein without departing from the spirit, of the invention or scope as defined in the following claims.

Having set forth the nature of the invention, what is claimed is:

1. A method for removing solids from waste water to form a sludge comprising oils, fatty acids greases, and drying said sludge to produce animal foodstuff said method comprising the steps of:
   (a) mixing a bentonite solution into said waste water;
   (b) mixing a polymer solution into said waste water,
   (c) forming a sludge containing flocculate bentonite, polymer, and solids, said sludge forming on the surface of clarified waste water;
   (d) transferring said sludge to an apparatus for drying; and
   (e) drying said sludge into a product useful as animal foodstuff comprising mixing hot air with said sludge during intense agitation in a first phase of drying, said agitation breaking up lumps and agglomerates and thoroughly mixing said sludge with said hot air, and retaining said sludge in a second phase of drying wherein secondary drying takes place through product retention time.

2. A method as defined in claim 1, wherein said miing step in (a) includes mixing said bentonite solution into said waste water at a ratio of 100–1000 milligrams of equivalent dry bentonite per liter of said waste water.

3. A method as defined in claim 1, wherein said mixing step in (b) includes mixing said polymer solution into said waste water at a ratio of 0.05–10 milligrams of equivalent dry polymer per liter of waste water.

4. A method as defined in claim 1, wherein said sludge forming step includes using air bubbles to float said sludge to said surface of said clarified water.

5. A method as defined in claim 1, wherein said hot air is introduced into said first phase of drying at a temperature between 500–1000 degrees Fahrenheit.

6. A method as defined in claim 1, further comprising the step of maintaining the pH of said waste water between 3.5 and 9.0 prior to said sludge forming step.

7. A method as defined in claim 6, wherein said pH is maintained between 6.0 and 9.0.

8. A method as defined in claim 7, wherein said drying step is performed within 36 hours of said sludge forming step.

9. A method as defined in claim 6, wherein said pH is maintained between 3.5 and 5.0.

10. A method as defined in claim 9, wherein said drying step is performed within 96 hours of said sludge forming step.

11. A method as defined in claim 1, wherein said agitation in said first phase and said retention time in said second phase are adjustable to change consistency of said foodstuff.

12. A method for removing solids from waste water to form a sludge comprising oils, fatty acids, greases, and drying said sludge to produce animal foodstuff said method comprising the steps of:

(a) maintaining the pH of said waste water between 3.5 and 9.0;

(b) mixing a bentonite solution into said waste water at a ratio of 100–1000 milligrams of equivalent dry bentonite per liter of waste water;

(c) mixing a polymer solution into said waste water at a ratio of 0.05–10 milligrams of equivalent dry polymer per liter of waste water;

(d) forming a sludge containing flocculate bentonite, polymer, and solids, said sludge forming on the surface of clarified waste water;

(e) transferring said sludge to an apparatus for drying; and (f) drying said sludge into a product useful as animal foodstuff, comprising mixing hot air with said sludge during intense agitation in a first phase of drying, said agitation breaking up lumps and agglomerates and thoroughly mixing said sludge with said hot air, and retaining said sludge in a second phase of drying wherein secondary drying takes place through product retention time.

13. A method as defined in claim 12, wherein said hot air is introduced into said first phase of drying at a temperature between 500–1000 degrees Fahrenheit.

14. A method as defined in claim 12, wherein said agitation in said first phase and said retention time in said second phase are adjustable to change consistency of said foodstuff.

15. A method as defined in claim 12, wherein said pH is maintained between 6.0 and 9.0.

16. A method as defined in claim 15, wherein said drying step is performed within 36 hours of said sludge forming step.

17. A method as defined in claim 12, wherein said pH is maintained between 3.5 and 5.0.

18. A method as defined in claim 17, wherein said drying step is performed within 96 hours of said sludge forming step.

* * * * *